Sept. 10, 1963 W. E. ATKINSON 3,103,268
HANDLE FASTENING MOUNTS FOR RECEPTACLE HANDLES
Filed Oct. 10, 1962
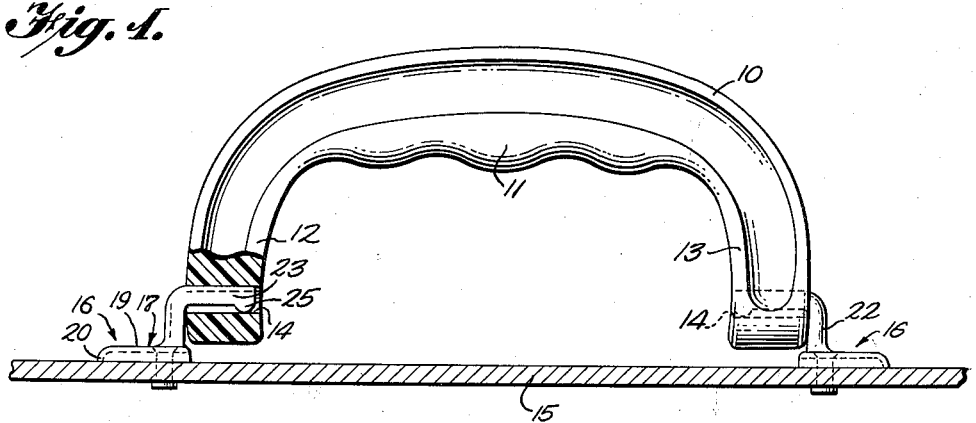
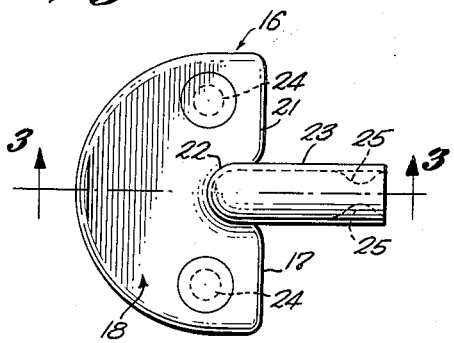
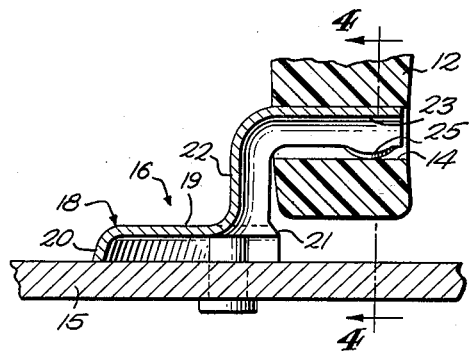
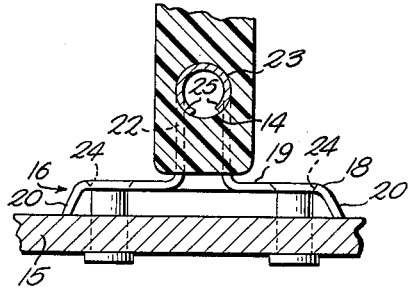
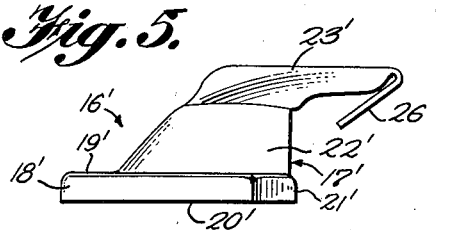
INVENTOR
*Wallace E. Atkinson*
BY
*Mason, Fenwick & Lawrence*
ATTORNEYS 3,103,268
HANDLE FASTENING MOUNTS FOR RECEPTACLE HANDLES
Wallace E. Atkinson, Petersburg, Va., assignor to Long Manufacturing Company, Inc., Petersburg, Va., a corporation of Virginia
Filed Oct. 10, 1962, Ser. No. 229,584
5 Claims. (Cl. 190—58)

The present invention relates in general to handle structure for suitcases, and similar portable receptacles, and more particularly to handle attaching mounts for pivotally securing the ends of handles to such receptacles.

Heretofore, fastening attachments for securing receptacle handles such as suitcase handles and the like to receptacles have been used which provide a pivot for the opposite ends of the legs of inverted U-shaped handles. However, such mounts have been of a relatively complex construction wherein opposite ends of a pivot pin at each end of the handle are releasably held in suitable socket portions of the mount associated with each handle end. Due to the nature of such fastening devices, the assembly and installation of handles with this mount structure was time-consuming and exacting, requiring very accurate spacing of the mounts on the luggage or receptacle wall to correspond properly with the spacing of the handle ends and then insertion of the pivot pins through accommodating openings in the handle ends and assembly of the exposed opposite ends of the pins into inwardly facing sockets of the mounts.

More recently, handle fastening mounts have been employed which are stamped from sheet metal and provide a body portion and an integral laterally projecting pivot portion adapted to be loosely fitted into the openings provided therefor in the legs of the handles. These handle fastening mounts were customarily assembled with the handle and to the wall of the receptacle by introducing the pivot portions of the mounts into the openings in the handle legs and then holding this subassembly over the luggage wall and securing the mounts to the luggage wall, as by driving penetrating prongs or lugs integrally formed with the mounts through the luggage wall and clinching the same beneath the luggage wall. Difficulties have been encountered with this handle fastening mount construction, as the loose fitting of the pivot portions into the openings of the handle legs did not reliably retain the mounts in assembled relation with the handle when the handle was manipulated to dispose the assembled mounts and handle over the luggage wall for the subsequent securing operation. The mounts that easily fall from the handle are accidentally moved out of proper alignment relative to the handle, necessitating frequent repositioning or reassembling of mounts with the handle and thus slowing the rate of production and increasing the labor cost involved in assembly. However, merely increasing the transverse size of the pivot portions of such prior mounts would not provide a satisfactory expedient for relief of this problem, since considerable lack of uniformity in size and shape of the holes provided in handles supplied by different manufacturers is encountered, some of the holes being circular and others being oval shaped, so that exceedingly large stocks of many different sizes of handle mounts would have to be maintained to accommodate variations in the size and shape of holes in the commercially available handles and even then proper movement of the handles from side-to-side about the pivot axes would be impeded for an unacceptably long period of time after assembly.

An object of the present invention, therefore, is the provision of novel handle fastening mount construction for securing handles to receptacles in a manner providing for pivotal movement of the handles laterally about a rectilinear axis adjacent the luggage, which is free of the foregoing disadvantages.

Another object of the present invention is the provision of novel handle fastening mounts for securing the end portions of legs of generally U-shaped handles to the walls of receptacles such as suitcases and the like, for pivotal movement about a rectilinear axis adjacent the receptacle wall, which facilitate assembly of the handles to a receptacle wall without disruption of production procedure and are self-accommodating to a variety of sizes and shapes of handle openings.

Other objects, advantages and capabilities of the present invention will become apparent from the following detailed description taken in conjunction with the accompanying drawing, illustrating two preferred embodiments thereof.

In the drawing:

FIGURE 1 is a side elevation view of a handle fastening mount and handle assembly constructed in accordance with a first embodiment of the present invention shown in assembled relation on a portion of a suitcase side wall;

FIGURE 2 is a top plan view of the handle fastening mount of FIGURE 1;

FIGURE 3 is a longitudinal vertical section view of the handle fastening mount, taken along the line 3—3 of FIGURE 2 and illustrating in section a fragmentary portion of a handle leg in assembled relation therewith;

FIGURE 4 is a vertical transverse section view thereof taken along the line 4—4 of FIGURE 3; and FIGURE 5 is a side elevation of a handle fastening mount of modified form.

Referring to the drawing, wherein like reference characters designate corresponding parts throughout the several figures, there is shown a handle 10 of the conventional upwardly arched or inverted U-shaped type customarily used with luggage, having an upper elongated grip portion 11 forming the bridge of the U and depending, integral leg portions 12, 13 extending from the grip portion. The handle is usually of molded plastic material, and is provided with aligned openings 14 adjacent the lower ends of the leg portions 12, 13. The openings 14 usually extend entirely through the leg portions and are adapted to receive pivot members secured in some way to the wall 15 of a suitcase or other receptacle, to provide a rectilinear pivot axis for the handle 10 closely adjacent to the suitcase wall about which the handle can pivot to an out-of-the-way position flat against the suitcase wall when the suitcase is not in use.

The handle fastening mounts of the present invention, designated by reference character 16, are designed to be secured to the suitcase wall 15, one of such mounts to be placed at the outside of each of the legs 12, 13 of the handle, and provide a pivotal support for the handle about the axis of the openings 14. Since the handle mounts 16 are of identical construction, a detail description of only one of the handle mounts is necessary. The handle mounts 16 are stamped or otherwise suitably formed of sheet metal, and includes a shell-like body portion 17 shaped to provide a generally flat mounting plate portion 18, which in the preferred embodiment herein illustrated includes a raised top panel 19 bounded by a depending flange or lip 20 extending around the side and outer end of the top panel 19 to abut the suitcase wall 15 and give the mounting plate a more massive appearance. The center portion of the body portion 17 adjacent the inner end 21 thereof is provided with a raised transition or post formation 22 of suitable configuration, from the upper region of which an axially elongated pivot projection or stem 23 extends generally along a rectilinear axis paralleling the plane of the top panel 19 and spaced above the lower edges of the flange 20 a distance slightly greater than the distance from the axis of the handle openings 14 to the free ends of the handle legs 12, 13. The pivot projection 23 extends inwardly beyond the inner end 21 of the mount body portion 17 a distance corresponding approximately to the axial length of an opening 14 in the handle legs so that the remote end of the projection 23 relative to the body portion will be within its associated handle opening 14. The pivot projection 23 is shaped to have a downwardly opening channeled or arched configuration curving concentrically about the axis of the pivot projection and presenting a convexly curved upper bearing surface which conforms generally to the curvature of the walls of openings 14 in the handle legs 12, 13. This configuration of the pivot projection 23 also gives this member the necessary strength and stress resistance to withstand the loads imposed thereon when the suitcase is carried by the handle. The post formation 22 is similarly arched to give this member the necessary strength. The mounting plate portion 18 is of sufficient width relative to the pivot projection 23 to provide flanking wing portions extending to each side of the pivot projection and post formation having apertures 24 through which rivets, screws or other fasteners are driven into the suitcase wall 14 or through the latter to affix the mounts 16 to the suitcase.

It will be appreciated that the problem of proper alignment and spacing of the handle fastening mounts 16 along the suitcase wall 15 in proper conformity with the spacing between the apertured parts of the handle legs 12, 13 which would be encountered with separable mount and pivot pin assemblies of the prior art are avoided with mounts having integral projecting pivots of the type herein described. The pivot projections 23 of the two mounts are first inserted in the openings 14 of the handle legs 12, 13 and then this assembly of handle and mounts is placed over the suitcase wall at the proper location and rivets or fastening screws are driven through the mounting plate apertures 24 into the suitcase wall. The pre-insertion of the mounts in the handle openings insures proper spacing of the mounts. However, difficulties have been encountered in the actual practice of fastening the handle and mount assemblies to the suitcast wall by this procedure if the pivot projections are dimensioned to provide a loose fit in the handle leg openings 14 to allow free rotation of the handles about the pivots, as the mounts readily fall out of the handle openings during the riveting operation or during transport of the handle mount to the proper location on the suitcase wall. This causes an interruption of the assembling procedure during retrieval of the dislodged mount and replacement in the handle opening, and occurs with sufficient frequency to produce significant slowing of the rate of production and increase of production cost. To merely enlarge the lateral dimensions of the pivot projections to a size which would effect a tight enough friction fit with the bounding surfaces of the handle opening to retain the mounts in assembled position in the handle during transport and riveting would prevent free rotation of the handle about the mount pivots for a long period after assembly until the metal edges of the pivot abraded the plastic handle enough to enlarge the openings 14 to a size to accommodate free movement. Also, large stocks of different sizes of mounts would have to be provided, because of the lack of uniformity in the size of the handle openings in plastic handles customarily supplied in the market and because of variations in shape of the holes in commercially supplied handles from circular shape to oval shape.

This problem is overcome in the present invention by providing enlarged head members, ears, teeth or like formations 25 along the lower edges or at the outer ends of the pivot projections 23 which depend below the lower edges of the shank portions of the projections 23 and provide terminal enlargements which form a sufficiently tight friction fit with the bounding surfaces of the handle leg openings 14 to hold the mounts assembled therein against accidental dislodgement. While the enlarged terminal formations 25 may be in abrading engagement with the plastic when introduced therein, they continue to fold toward each other in response to pressure of the surfaces bounding the openings 14 as the handle is moved from side to side about the pivot axis and quickly assume a configuration which permits free movement of the handle about the pivot axis. Also, the extent of the edges of the enlargements which is in abrading contact with the plastic bounding surfaces is so small that the pressure is very large and rapid abrading of the plastic to the necessary extent to provide free movement takes place if the enlargements do not fold sufficiently to provide the free movement.

It will be apparent that the specific shape employed for the terminal enlargements on the pivot projections is subject to wide variation to accomplish the intended purposes of frictionally retaining the pivot projection of the mount seated in its accommodating opening in the handle leg against accidental dislodgement during the movement of the assembled mounts and handle to their desired location on the suitcase wall and securing of the mounts thereto and permitting rapid adjustment of size of the pivot projection or handle opening to provide completely free movement of the handle about the pivot axis.

There is illustrated in FIGURE 5 a specific modified form of the handle fastening mount, here indicated by the reference character 16'. The mount 16' is generally similar in configuration to the first embodiment hereinabove described, the mount 16' having a shell-like body portion 17' formed of bendable sheet metal shaped to provide a generally flat mounting plate portion 18' having a raised top panel 19' bounded on three sides of a depending flange 20'. The raised post formation 22' is somewhat larger than the corresponding element of the first embodiment, this being subject to wide variation at the option of the designer to provide the desired appearance, and an axially elongated pivot projection or stem 23' of channel cross-section projects beyond the inner end 21' of the mounting plate portion along a rectilinear axis paralleling the plane of the top panel. However, instead of terminating in depending enlargements of the shape shown in FIGURES 1 to 4, the outer or remote end of the pivot projection 23' has a downwardly folded and inwardly inclined narrow finger 26 integral with the projection 23'. The finger 26 is preferably of a width to fit between the sides of the channel defined by the projection 23'. The finger 26 is initially inclined to assume an outwardly pointing acute angle with the axis of the projection 23' such that the maximum vertical dimension from the free end of the finger 26 to the top of the projection 23' is slightly greater than the largest diameter of openings 14 encountered in handles. As the finger 26 presents an inclined surface to enter into camming abutment the edge of the opening 14 upon insertion of the pivot projection into the opening, the finger 26 will be readily folded under the pressure of insertion to fit into the opening 14 and will be self-conforming to the diameter of the opening to maintain enough frictional engagement with the bounding surface of the opening to restrain the handle and mount against accidental dislodgment. However, the finger 26 will be folded to an even more acute angle under the pressure of the suitcase when it is lifted by the handle, permitting free rotary movement of the handle about the pivot thereafter.

While but two preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A handle fastening mount for a handle of the type having axially aligned openings in a pair of end portions of the handle for attaching the handle to a flat receptacle wall for pivotal movement about the axis of the openings comprising a sheet metal body having a mounting plate portion adapted to be secured to the receptacle wall, an elongated pivot projection integral with said mounting plate portion extending beyond an end of the mounting plate portion along a rectilinear axis spaced above said mounting plate portion to project into one of said handle openings and form a pivot therefor, said pivot projection having a channel cross-sectional configuration extending over most of its length to resist deformation of the pivot projection under load when disposed in one of said handle openings and being dimensioned to permit free rotation of the handle about said pivot projection, and said pivot projection having bendable extension formation means adjacent the end thereof remote from said mounting plate portion initially providing a transversely enlarged section of greater transverse extent than said handle opening and deformable by the bounding surface of said opening upon insertion of the pivot portion to frictionally press against the opening bounding surface and restrain the pivot projection against accidental dislodgment from the handle opening.

2. A handle fastening mount for a handle of the type having axially aligned openings in a pair of end portions of the handle for supporting the handle on a flat receptacle wall in pivotal relation about an axis adjacent the wall and aligned with the openings comprising a sheet metal body having a mounting plate portion including a substantially flat top panel and depending peripheral flanges adapted to be secured to the receptacle wall in abutment therewith, an elongated pivot projection integral with said mounting plate portion extending beyond an end of the mounting plate portion along a rectilinear axis spaced above and substantially paralleling the top panel of said mounting plate portion to project into one of said handle openings and form a pivot therefor, said pivot projection having a downwardly opening channel configuration extending throughout its length providing a convex exterior bearing surface conforming substantially to the curvature of the internal handle surface bounding said opening and being dimensioned to permit free rotation of the handle about said pivot projection, and said pivot projection having downwardly extending bendable enlargement formations adjacent the end thereof remote from said mounting plate portion providing abutment portions of greater transverse spacing than the internal handle opening surface portions adjacent thereto to be deformed inwardly by engagement with said handle opening surface portions and frictionally press against the internal handle opening surface for restraining the pivot projection against accidental dislodgment from the handle opening.

3. A handle fastening mount for a handle of the type having axially aligned cylindrical openings in a pair of end portions of the handle for supporting the handle on a flat receptacle wall in pivotal relation about an axis adjacent the wall and aligned with the openings comprising a sheet metal body having a mounting plate portion including a substantially flat top panel and depending peripheral flanges adapted to be secured to the receptacle wall in abutment therewith, an elongated pivot projection integral with said mounting plate portion and joined to said top panel by a rising transition formation of arched configuration, said pivot projection extending beyond an end of the mounting plate portion along a rectilinear axis spaced above and substantially paralleling the top panel of said mounting plate portion to project into one of said handle openings and form a pivot therefor, said pivot projection having a channel cross-sectional configuration extending over most of its length to resist deformation of the pivot projection under load when disposed in one of said handle openings and being dimensioned to permit free rotation of the handle about said pivot projection, and said pivot projection having substantially straight lateral edges over the major portion of the length thereof and bead-like extensions projecting circumferentially beyond said edges adjacent the outer end thereof remote from said mounting plate portion disposed to be deformed inwardly by engagement with opposite portions of the internal handle opening surface below the center axis of the associated opening and frictionally press thereagainst for restraining the pivot projection against accidental dislodgement from the handle opening.

4. A handle fastening mount for a handle of the type having axially aligned openings in a pair of end portions of the handle for supporting the handle on a flat receptacle wall in pivotal relation about an axis adjacent the wall and aligned with the openings comprising a sheet metal body having a mounting plate portion including a substantially flat top panel and depending peripheral flanges adapted to be secured to the receptacle wall in abutment therewith, an elongated pivot projection integral with said mounting plate portion and joined to said top panel by a rising transition formation of arched configuration, said pivot projection extending beyond and end of the mounting plate portion along a rectilinear axis spaced above and substantially paralleling the top panel of said mounting plate portion to project into one of said handle openings and form a pivot therefor, said pivot projection having a downwardly opening channel configuration extending throughout its length providing a convex exterior bearing surface conforming substantially to the curvature of the internal handle surface bounding said opening and being dimensioned to permit free rotation of the handle about said pivot projection, and said pivot projection having substantially straight downwardly facing lateral edges over the major portion of the length thereof and depending bead-like extensions adjacent the outer end thereof remote from said mounting plate portion sized to be deformed inwardly by and frictionally press against opposite portions of the internal handle opening surface below the center axis of the associated opening and restrain the pivot projection against accidental dislodgment from the handle opening.

5. A handle fastening mount for a handle of the type having axially aligned substantially cylindrical openings in a pair of end portions of the handle for supporting the handle on a flat receptacle wall in pivotal relation about an axis adjacent the wall and aligned with the openings comprising a sheet metal body having a mounting plate portion including a substantially flat top panel and depending peripheral flanges adapted to be secured to the receptacle wall in abutment therewith, an elongated pivot projection integral with said mounting plate portion extending beyond an end of the mounting plate portion along a rectilinear axis spaced above and substantially paralleling the top panel of said mounting plate portion to project into one of said handle openings and form a pivot therefor, said pivot projection having a channel cross-sectional configuration extending throughout its length providing a convex bridge portion and laterally spaced flange portion and being dimensioned to permit free rotation of the handle about said pivot projection, and said pivot projection having a diametrically extending, integral bendable finger adjacent the end thereof remote from said mounting plate portion forming an acute angle with the axis of said pivot projection and having a diametrical length between the convex bridge portion and the free end of said finger greater than the diameter of said handle opening, said finger being folded toward the axis of said pivot projection by engagement with the handle opening surface upon insertion of the pivot projection therein to a position wherein the finger frictionally presses against opposite portions of the internal handle opening surface to restrain the pivot projection against accidental dislodgment from the handle opening, and said finger being further bendable by said handle opening surface inwardly toward said axis upon lifting of said handle to assume a position permitting free rotation of the handle about said pivot projection.

No references cited.